(No Model.)
C. L. BALDWIN.
PLANT SUPPORT.
No. 603,754. Patented May 10, 1898.
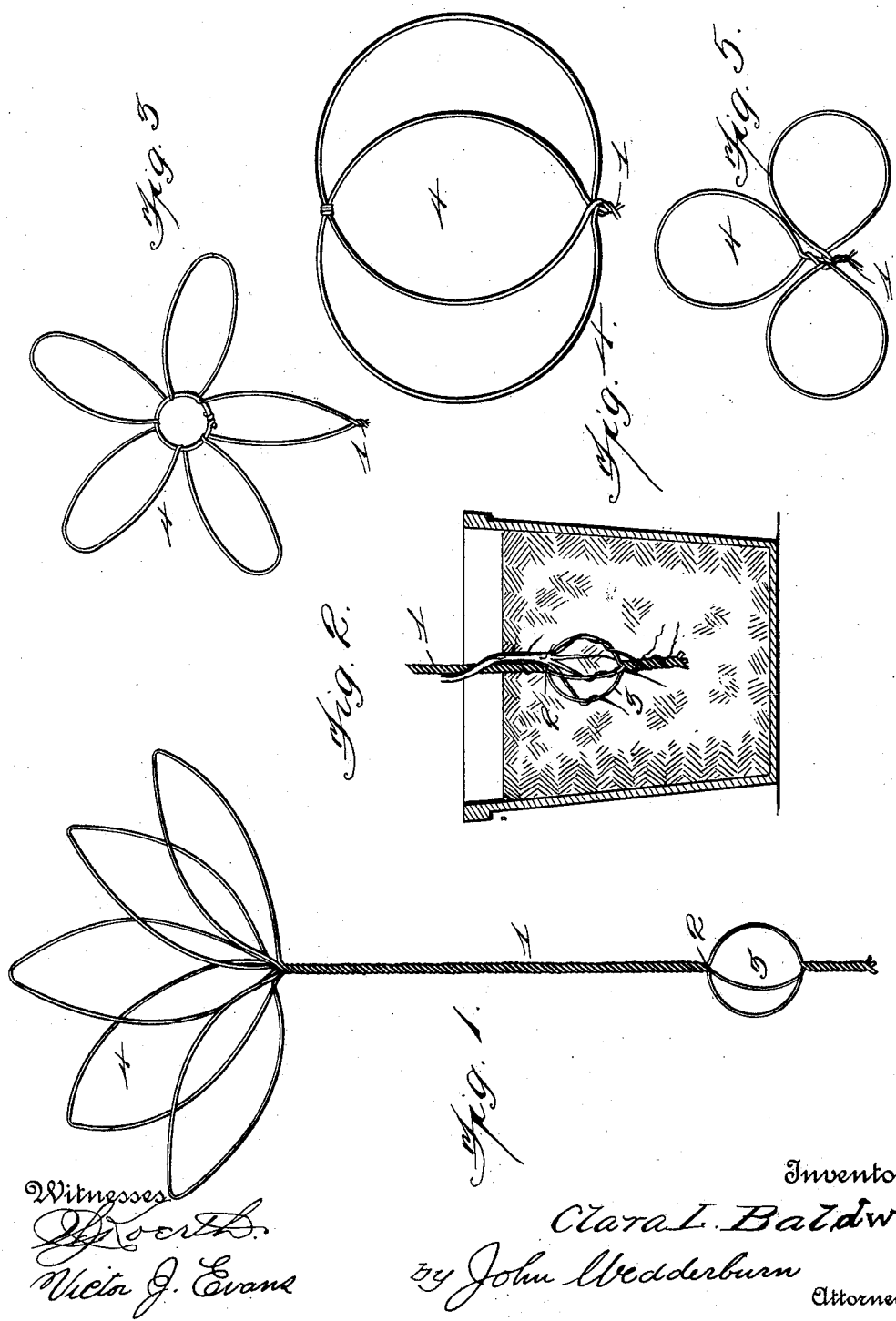

UNITED STATES PATENT OFFICE.

CLARA L. BALDWIN, OF NATIONAL CITY, CALIFORNIA.

PLANT-SUPPORT.

SPECIFICATION forming part of Letters Patent No. 603,754, dated May 10, 1898.

Application filed August 27, 1897. Serial No. 649,749. (No model.)

*To all whom it may concern:*

Be it known that I, CLARA L. BALDWIN, a citizen of the United States, residing at National City, in the county of San Diego and State of California, have invented certain new and useful Improvements in Plant-Supports; and I do hereby declare the following to be a full, clear, and exact description of the invention, such as will enable others skilled in the art to which it appertains to make and use the same.

This invention relates to plant-supporters; and the object in view is to provide a simple, cheap, and convenient device of the character referred to which may be used either for potted plants or out-of-door plants and vines.

By means of the improved support hereinafter described the usual sticks or stakes employed for supporting plants are dispensed with and a neat, ornamental, and durable support is provided which, prior to the trailing of the vine or plant thereon, is ornamental, and which also provides for more effectually bracing and supporting the device itself, thereby rendering the same more efficient for the use for which it is designed.

The detailed objects and advantages of the invention will appear in the course of the ensuing description.

The invention consists in an improved plant-support embodying certain novel features of construction hereinafter fully described, illustrated in the drawings, and pointed out in the claims hereto appended.

In the accompanying drawings, Figure 1 is a perspective view of one of the improved plant-supporters. Fig. 2 shows a support set in a flower-pot and illustrates the manner in which the support is braced and engaged by the roots of the plant; and Figs. 3, 4, 5, 6, and 7 illustrate modified forms of the support.

Similar numerals of reference indicate corresponding parts in the several views.

The improved plant-support contemplated in this invention is constructed wholly of wire. This wire may be of any suitable gage, according to the strength that is required and the nature or size of the plant in connection with which the support is to be used.

The support comprises, essentially, a stem 1, which is formed by twisting several wires upon themselves, as shown, the lower ends of said wires being deflected in opposite directions or diverged and bent in semicircular form and again brought together at the point 2, where they are twisted farther upon themselves, thus forming a series of arc-shaped portions 3, which collectively form a hollow or skeleton ball, bulb, or anchor for the support. At the upper end of the stem 2 some or all of the wires are extended upward and are bent to form loops or circles 4, representing leaves or petals of various flowers, such as wild roses, azaleas, three-leaf clovers, stars, &c. In fact, any desired configuration may be imparted to the top of the plant-holder, and thus before the vine twines the stem the plant-support as a whole presents an ornamental and attractive appearance.

In setting out a plant the base portion of the stem, including the skeleton ball, is embedded in the earth adjacent to the plant, and the roots of the plant, radiating and spreading in all directions, pass through and interlock with said ball or anchor, thus giving a firm support to the device in the earth.

It will of course be understood that the device herein described is susceptible of various changes in the form, proportion, and minor details of construction, which may be resorted to without departing from the principle or sacrificing any of the advantages of the invention.

Having thus described my invention, what I claim as new, and desire to secure by Letters Patent, is—

1. The herein-described plant-supporter, consisting of wires twisted together to form an upright stem, an ornamental top to said stem formed by bending the wires into loops or rings, and an anchoring device at the lower end of said stem formed by bending or deflecting the wires in opposite directions and bringing the same together and again uniting them, substantially as described.

2. A plant-support, consisting of wires twisted together to form a stem, an ornamental top formed by bending the wires into loops, rings, &c., and an anchor formed by deflecting or bending the wires at the base of the stem in various directions, substantially as described.

In testimony whereof I have signed this specification in the presence of two subscribing witnesses.

CLARA L. BALDWIN.

Witnesses:
W. S. HILL,
FRED H. SAMBORN.